United States Patent [19]

Hering, Jr.

[11] Patent Number: 5,543,037

[45] Date of Patent: * Aug. 6, 1996

[54] DYNAMIC FILTRATION FILTER APPARATUS WITH LEVEL CONTROL AND DEFLECTOR PLATE

[76] Inventor: C. J. Hering, Jr., 2920 NW. 67th Ct., Fort Lauderdale, Fla. 33309

[ * ] Notice: The term of this patent shall not extend beyond the expiration date of Pat. No. 5,462.654.

[21] Appl. No.: 449,227

[22] Filed: May 24, 1995

Related U.S. Application Data

[63] Continuation of Ser. No. 128,125, Sep. 29, 1993, Pat. No. 5,462,654.

[51] Int. Cl.[6] .............................. B01D 24/28; B01D 24/48
[52] U.S. Cl. .......................... 210/104; 210/189; 210/268; 210/290
[58] Field of Search ............................ 210/97, 104, 109, 210/189, 268, 269, 275, 290, 792, 793

[56] References Cited

U.S. PATENT DOCUMENTS

| | | | |
|---|---|---|---|
| 1,007,929 | 11/1911 | Deacon et al. | 210/189 |
| 1,123,704 | 1/1915 | Deacon et al. | 210/189 |
| 1,620,431 | 3/1927 | Bramwell | 210/189 |
| 1,740,199 | 12/1929 | Nordell | 210/189 |
| 1,861,295 | 5/1932 | Bramwell | 210/189 |
| 4,060,484 | 11/1977 | Austin et al. | 210/189 |
| 4,126,546 | 11/1978 | Hjelmner et al. | 210/793 |
| 4,197,201 | 4/1980 | Hjelmner | 210/189 |
| 4,891,142 | 1/1990 | Hering | 210/189 |
| 5,173,194 | 12/1992 | Hering | 210/189 |
| 5,462,654 | 10/1995 | Hering | 210/189 |

FOREIGN PATENT DOCUMENTS 108430 12/1927 Australia ............................ 210/189

*Primary Examiner*—Joseph W. Drodge
*Attorney, Agent, or Firm*—Kenneth E. Merklen

[57] ABSTRACT

A filter apparatus of the dynamic mass granular filter type, for filtering contaminants from a liquid includes a vessel which contains a first chamber, a second chamber and a conduit pipe which connects the two chambers. The first chamber includes a sump defined by vertical walls and a flat bottom, and supports a dynamic filter bed of granular filter material. The second chamber receives a portion of the mass of granular filter material drawn from the filter bed in the sump and a portion of the liquid, in a flow of liquid through the conduit pipe and cleans and returns the portion of the mass of granular material to the dynamic filter bed through an opening in the second chamber, the size of which is adjustable from a position remote from the vessel. A filtrate recovery chamber, positioned within the dynamic filter bed, has perforated side walls for passing filtrate into the recovery chamber. The side walls are parallel with the movement of the filter materials passing the filtrate recovery chamber. A filter material deflector plate located in the filter bed and down stream from the side walls relative to the movement of the filter material past the side walls, checks the movement of the filter material passing the side walls. Interference to movement by the deflector plate is adjustable from a position remote from the vessel.

6 Claims, 4 Drawing Sheets

MEDIA LEGEND

MOST FINE

MEDIUM

MOST COARSE

DYNAMIC FILTRATION FILTER APPARATUS WITH LEVEL CONTROL AND DEFLECTOR PLATE

This application is a Continuation of U.S. patent application Ser. No. 08/128,125, filed Sept. 29, 1993, now Pat. No. 5,462,654.

BACKGROUND OF THE INVENTION

1. Field of the Invention

The present invention relates to apparatus, a system and a method for filtering suspended solids and insoluble matter from a liquid using a captured and controlled filter medium. In particular, the invention relates to improved apparatus and an improved method for filtering foreign matter from a liquid using a moving filtering bed of granular filter material of varying texture and extracting the filtered liquid from the most fine zone or layer of the filtration material.

2. Prior Art

The use of down-flow, varying texture, granular media filters, in which the filtration media is circulated on a continuing basis, being withdrawn from a lower portion of the filter bed, and raised to a wash chamber for cleansing the filtration medium and for returning the cleansed media to the filter bed, is well known.

The continuous circulation of filter media technique has been found preferable over static media filtration techniques, the latter requiring periodic backwash interruption in the filtration process. The U.S. Pat. No. 1,007,929, issued in 1911 to M. Deacon and W. Gore, discloses a hybrid filter system which uses both dynamic, or circulating filter media and static, or stable filter media filtration techniques. In this 1911 patent the dynamic portion of the filtration media moves downward in the filter container or vessel, past a particularly defined static portion of the filtration media. The inventors of this hybrid system state, "... it is a recognized advantage in filters that the medium near the outlet shall remain comparatively undisturbed." Although the apparatus of inventors appears functional, it is evident however, that over time, an undesirable saturation of the filter media, in the static portion of the filtration bed, is inevitable and will contribute to undesirable pressure loss, resulting in a reduction in the efficiency of the system.

Since the static filter media portion of the filtration bed is not circulated and cleansed by the same process used to circulate and cleanse the dynamic filter media portion of the filtration bed, it is apparent that the filter system disclosed in this 1911 patent, will require cleaning the static filter media by the traditional backwash method or by replacement of the captured media, or by some other cleaning process, any of which will require down time.

U.S. Pat. No. 4,060,484, issued to Austin et al, in 1977 and my U.S. Pat. No. 4,891,142, issued in 1990, both disclose filter systems of the dynamic, down-flow type. Each system employs a totally dynamic filter bed which, while entraining filtered particles to the wash portion of the system, progressively moves downward in the system cycle and passes directly against a filter media retaining sieve, where the filtered liquid or filtrate, is drawn off. Although eventually the entire filter bed media is cleansed of filtered particles, and the cleansed filter media is recycled to the filter bed, movement of the filter media past the filter retaining sieve, where recovery of the filtrate takes place, is largely uncontrolled. The teachings in both these patents disclose that the vast majority of the coarsest filter media or material, is found to be the most active, and consequently the dirtiest media in the filter bed. Although my patent teaches positioning the draw-off means within a layer of the most fine granular filter media of the filter bed, movement of the filter media, past the filter retaining sieve of the draw-off means, is virtually at an uncontrolled rate. It is acknowledged, by those skilled in the art that movement disturbances of the filter bed, particularly in the area adjacent to the retaining sieve, containing filtered particles, will cause filtered particles to dislodge and to be lost and may drive particles through the retaining sieve, thus reducing filtration efficiency. The degree of movement disturbances, as described above, is increased proportionally to the rate of downward flow or movement of the filter media.

It is also acknowledged, by those skilled in the art, that the downward velocity of a granular filter media bed, in a vessel of which the lower walls are inclined downwardly and inwardly is not uniform throughout the filter bed when portions of the bed are withdrawn from the center of the base of the vessel. It has been found that the greatest velocity of downward movement of the filter bed is in the area immediately above the point of filter media draw-off and that the slowest rate of descent of the filter bed, is along the inside of the vessel walls. The differential in filter media movement rates in the area directly over the point of filter draw-off and at the outer periphery of the bed, can be altered by the slope, inwardly and/or downwardly, of the conical or pyramidal bottom of the vessel. However, relying on the slope of the conical or pyramidal bottom, as taught in the prior art, is inefficient if conditions change requiring a change in the slope of the vessel. Furthermore, selection of a slope in the vessel wall sufficiently steep to insure that the outer periphery of the filter bed moves downwardly at a predetermined desired rate, may be too great a slope to insure sufficient capture and may not be in harmony with the operational flow of the filtration cycle.

Centrally located deflector cones, as suggested in the prior art, have relatively limited effect on the movement of the granular filter media of the filter bed and less effective on movement in the filter media adjacent the filter media retaining sieve of the filtrate recovery means. However, it is apparent from the present invention that the full potential of deflector cones in a multi-texture, granular filter environment have not been recognized nor utilized.

It is desirable to have control over the rate of movement of the granular filter media within the area of, or adjacent to a retaining sieve of a filtrate recovery means, without relying solely on the geometry of the vessel. It is further desirable that control of movement of the granular filter media be variable, to suit changing conditions and/or varying applications, without costly modifications to the vessel.

A problem is that gravity, acting on the filter media moving along and parallel to an inclined wall of a vessel, is not as efficient in moving the media as when acting on vertically moving filter media. This is because of friction between the interior of the vessel wall and the media moving along the wall and the influence of the friction extending into the filtration media.

These problems are addressed and overcome by the present invention.

OBJECTS OF THE INVENTION

An object of the present invention is to provide an improved apparatus and method for filtering liquids using dynamic flow of a granular filtration media of varying texture.

A further object is to provide novel apparatus for improving the control of the downward movement of the granular filter media of the filter bed adjacent to the retaining sieve of the filtrate recovery means, in a dynamic flow liquid filtering device employing a granular filtration medium of varying texture.

A still further object is to provide novel apparatus for improving the downward movement of the granular filter media of the filter bed in a dynamic flow liquid filtering device in which the granular filter materials are collected in a sump defined by vertical walls and the granular filter materials are elevated from the sump by a lift means.

Still another object is to provide a liquid filtering apparatus of the mobile bed, variable texture granular filtration type in which the returned filter medium is laid down in vertical layers of predetermined thickness and location, forming the filter bed.

Another object is to provide a liquid filtration apparatus, of the mobile bed, granular filter media type with an improved and more efficient internal transport system.

These and other objects will become more apparent upon reading the detailed description referenced to the drawings.

SUMMARY OF THE INVENTION

The present invention is a novel filtration apparatus, system and method wherein the apparatus comprises a liquid impervious vessel supporting a dynamic vertical column of varying texture granular filtration material, generally referred to as a filter bed. The vessel includes a central chamber, which houses the filter bed, and in which the filtering operation is accomplished; a wash chamber, in which the granular filtration material is cleansed of captured contaminates, and a conduit lift means that transports granular filtration material and the captured contaminates from the central chamber to the wash chamber. The cleansed filtration media is returned to the central chamber, through a filter media fall-out opening between the wash chamber and the central chamber. The granular filter material returned to the central chamber from the wash chamber, is diverted to a particular drop zone for forming the filter bed for filtering the liquid.

In a preferred embodiment of the invention, the vessel defines a central chamber which has vertical walls in the upper region of the chamber and lower inclined walls, converging on a centrally located sump. The sump is defined by vertical walls and a substantially flat bottom. The central chamber supports the filter bed which is in continuous motion or movement when the filter apparatus is in operation. The inclined walls of the central chamber direct the granular materials of the filter bed to the centrally located sump, which utilizes the full force of gravity to move the granules downward in the sump to the opening of a lift means, located in the sump. Granular materials from the filter bed are captured and lifted up the lift means by a flow of liquid through the lift means, to the wash chamber and deposited in the wash chamber for cleansing.

Preferably, the wash-chamber is located in the upper central region of the central chamber and includes a weir and an outlet which maintains the level of the liquid in the wash chamber below the level of the liquid in the central chamber, creating a continuous flow of liquid into the wash chamber. A pipe or tube, connected between the wash chamber and the sump, serves as a lift means, to transport liquid from the sump to the wash chamber. The flow of the liquid into and through the lift means draws granular materials from the sump and lifts the materials to the wash chamber where the liquid and the filter materials are deposited, and the filter materials are cleaned. The cleansed granular materials are returned to the filter bed through the fall-out opening between the wash chamber and the central chamber, the returned filter material being intercepted by a conical deflector plate and diverted from a normal downward path to a selected drop zone on the filter bed for regenerating the depleted filter bed.

The conical deflector plate, preferably oriented with its apex up, facing the downward flow of the returning filter media, is centrally located in the central chamber, closely adjacent to the fall-out opening of the wash chamber, so that the returning filter media falls on the inclined surface the conical deflector plate.

The length of the radius of the inclined plate of the deflector cone is such that while the apex of the deflector cone approximates the center of the central chamber, the edge of the inclined deflector plate approximates the mid-point a radius extending from the perimeter of the central chamber to the center thereof, at the point of drop-off of the filter media falling from the inclined surface of the deflector cone. By locating the edge of the inclined plate substantially at the mid-point of the radius of the central chamber, the granular filter media, falling off the edge of the deflector cone, falls in a predetermined drop zone on the filter bed and generates a multi-layer filter bed of positioned layers of naturally separated granular material, separated according to the granular texture characteristics of the filter media.

Considering the fall-out opening between the wash chamber and the central chamber, the neck of the fall-out opening is preferably a flexible material and includes a means, which is operated remotely, for enlarging and for reducing the space between the throat of the opening and the lift means extending through the fall-out opening, effectively changing the size of the opening of the fall-out opening, as desired. Preferably, the size of the opening of the throat is controlled, however, it may be desired to control the size of the opening at the mouth of the fall-out opening.

The liquid in the central chamber is maintained at a working level by maintaining an input supply of liquid and controlling the outlet flow of the filtered liquid. The liquid in the wash chamber is maintained at a second level, below the working level of liquid in the central chamber, by liquid flowing over the weir and out a wash chamber outlet. This creates two different liquid levels in the same body of liquid. The liquid in the filter, in seeking to equalize the liquid levels, flows through the lift pipe into the wash chamber and through the fall-out opening into the wash chamber. By enlarging or reducing the size of the fall-out opening, as desired, positive control of the flow of liquid between the central chamber and the wash chamber is obtained. Control of the flow of liquid through the fall-out opening is a fine tune control of the filtering apparatus and the filtering operation.

The granular filter media emerging from the fall-out opening of the wash chamber falls on to the inclined surface or plate of the deflector cone and travels to the edge of the cone, where the filter media falls off the edge, into the area of the central chamber forming or adding to the continuously depleted filter bed. In the descent of the granular filter material, from the edge of the deflector cone, the most coarse of the filter media falls down and away, that is, to the sides of the vertical from the drop-off point at the edge of the deflector cone, and the most fine of the filter media falls, following most closely, the vertical from the edge of the deflector cone. The filter bed that is generated is a torus or doughnut shape filter bed of multiple, vertical layers of filter material, where the extreme vertical layers, that is, outer and inner layers, as seen in a cross-section of the doughnut shape from the perimeter to the center of the doughnut, are composed of the most coarse granular filter material and the center vertical layer of the filter bed, that is, that portion of the filter bed essentially embracing the mid-point of a radius passing through the filter bed, is made up of the most fine material of the granular filter media. Between the most fine layer of filter media and the most coarse layers of filter media the texture of the filter media forming the layers enlarges progressively as the filter media bed progresses outward from the most fine material to the most coarse material in the filter bed.

By taking advantage of the natural separation of the granular filter media, a filter media deflector cone is located within the central chamber of the filter vessel and positioned to intercept the filter media being returned to the filter bed after cleansing. The returned filter media is dropped off the edge of the deflector cone at a point that is essentially at the mid-point of a radius extending from the perimeter of the filter bed and the center of the central chamber, defined by the lift pipe. With the use of this structure, a filter bed of cleansed filter media is laid down in controlled, vertically disposed layers so that a double spectrum of granular filter media layers is obtained and the surface area of most coarse filter media is essentially doubled over the filter beds in the prior art.

By directing the filter media to a selected drop zone on the filter bed, a controlled double spectrum of vertical layers of filter material, forming a torus shape filter bed is provided with the most fine filter media layer extending vertically on the inside of the filter bed and the most coarse filter media layers extending vertically at the extremes of the filter bed, and the location of the various layers of filter media in the filter bed is established and positively controlled.

With the location of the most fine layer of filter material established and controlled, a filtrate recovery means is positioned in that area of the central chamber where the most fine layer of granular filter material of the filter bed is layered. This means that the filtrate drawn from the filter bed will have passed through all the granular layers of the granular filter bed, and will have been filtered by the entire spectrum of filter layers in the filter bed before being drawn off by the filtrate recovery means. This means that the full capability of the filter apparatus is being used.

The problem of controlling the downward movement of the filtration media at the filtrate draw-off is addressed and solved by locating the filtrate draw-off means in a predetermined layer of the granular filter media of the filter bed.

Preferably, the filtrate recovery chamber or filtrate draw-off means is located in the layer of most fine granular material of the granular filter bed. Structurally, the filtrate draw-off means includes a chamber, the inlet opening of which is covered by a sieve with the outlet opening coupled to an outlet pipe. The upper wall of the chamber is capped with a deflector cone, preferably having a substantially acute apex, and oriented so that the apex of the cone is directed most positively in line with, and facing the flow of that portion of the filter bed in which the draw-off means is located. The filter sieve covers the inlet opening of the chamber which is positioned at normal to the direction of movement of the filter media. The filter sieve prevents the filter media from entering the chamber and being dispensed with the filtrate. The filter sieve is located directly below the lower edge of the deflector cone and in line with the line of flow of the granular media in which the filtrate chamber is located. Preferably, the filter sieve is sufficiently fine so that the sieve functions to keep the most fine granular filter material from entering the filtrate outlet. Liquid, which was supplied to the central chamber of the filter vessel, at its inlet, for filtering, has passed through the filter bed layers and the filtered liquid, or filtrate, will pass through the filter sieve, into the filtrate chamber and be drawn off through the filtrate outlet pipe.

In order to control movement of the filter media moving along the sieve on the filtrate chamber, a deflector plate is provided immediately below the bottom edge of the filter sieve, in the downstream direction. The deflector plate is essentially oriented to interfere with the movement of the filter media in contact with and/or closely adjacent to the sieve covering the opening of the filtrate recovery chamber, and permit the remainder of the filter material in the filter bed to proceed uninterrupted, in the cyclic movement of the filter. However, the attitude of the deflector plate, relative to the direction of movement of the filter material, is adjustable so that the effectiveness of the deflector plate in stemming the flow or movement of the filter media past the filter sieve may be changed, as desired.

The deflector plate and the structure for changing the attitude or orientation of the deflector plate may be in several different forms. Preferably, the deflector plate is a plurality of plates with overlapping edges, which are attached at common ends to the base of the recovery chamber by hinge means, for example. Extending below the deflector plates and connected to the base of the filtrate draw-off means is a threaded shaft. A threaded collar is screwed on to the threaded shaft so as to travel up and down the shaft by rotating the collar. In a preferred embodiment, gearing means, rotated from outside the vessel, is provided so that the collar is rotated, either clockwise or counterclockwise, as desired, to raise or lower the collar on the shaft. In its upper most position, the top of the collar impinges against the under portion of the hinge connected plates of the deflector plate, urging the plates to a ninety degree position relative to the direction of movement of the filter media passing the sieve, so as to block or check the movement or flow of the filter media past the filter sieve. The deflector plate at normal to the movement of the filter media past the sieve provides maximum check of the movement of the filter media, without causing unwanted blockage or back flow. When the collar is rotated, so as to be driven down the shaft, bottom pressure on the deflector plates is relieved and the plates pivot on their hinge connectors, in the direction of movement, offering less interference to the flow of the filter media past the filter sieve.

By using a deflector plate positioned at the downstream end of the filter sieve on the filtrate draw-off means, movement of the filtration media in the area above the deflector plate, where the filter media passes the filter sieve of the filtrate draw-off means, is stemmed or checked. By making the attitude or angular position of the plates adjustable, relative to the direction of movement of the filter media, movement of the filter media in the area above the deflector plate, where the filter media passes the filter sieve of the filtrate draw-off means, is controlled. The amount of interference to movement of the filter media is a function of the angular position of the deflector plate, relative to the movement or flow of the filter media past the deflector plate.

Since the position and orientation of the vertical layers of a filter bed may be controlled, other characteristics of the filter bed may also be controlled. By establishing the ratio of the various textures of granular material, one to the other, the thickness of the various layers of the filter bed may also be controlled. The thickness of a specific layer of granular material may be established, as desired, by adjusting or changing the ratio between the total volume of the varying texture granular media and the volume of the grade or texture of granular material of the layer to be adjusted or controlled. For example, if the layer of most fine granular material in the filter bed is to be made thick or thicker than obtained, the volume of most fine granular material, relative to the volume of the entire filter medium should be increased.

The position of the deflector cone in the central chamber of the filter vessel and the location of the edge of the deflector cone, forming a selected drop zone on the filter bed, combine to provide a filter bed of selectively positioned, vertical layers of filter material, in which the area of the most coarse layer of filter media in a multi-grade filter bed may be greatly increased over a corresponding area of multi-grade filter bed of the prior art.

Because defined layers of filter media are positioned according to the location of the edge of the deflector cone, the ratio of granular materials used in the filter material, that is, the ratio of most coarse, to coarse, to medium, to fine and to most fine, for example, may be calculated to provide the maximum surface area of most coarse filter material for the size of the filter bed and at a layer of desired thickness, while still controlling the thickness of others of the layers of filter media in the filter bed. By controlling the thickness of the various layers of filter media in the filter bed, the location and definition of the respective layers of filter media in the filter bed may be accurately determined. A filtrate recovery chamber and associated outlet means may now be positioned in the filter bed so that the filtrate collection chamber is located in, and surrounded by a layer of the most fine granular filter material at all times during the filter operation.

By using a deflector plate, positioned in the moving layer of most fine granular filter media, downstream from the filtrate recovery chamber, movement of the most fine granular filter media past the sieve of the chamber may be checked or stemmed and by making the attitude or angular position of the deflector plate adjustable movement of the granular media, past the filtrate recovery chamber and/or the filter sieve over the opening of the chamber, may be controlled.

The granular filter material in the filter bed is continuously withdrawn from the filter bed, depleting the filter bed from the bottom of the bed. The removed filter media is elevated in the lift pipe or lift means to the wash chamber for cleansing. In order to insure that all the filter materials are cycled and cleaned, the granular materials in the filter bed are directed to a sump in the bottom of the central chamber. The sump, defined by substantially vertical walls and a substantially flat bottom defines the lowest region of the central chamber. The vertical structure of the sump permits the full force of gravity to act on or assist in moving the granules of the filter media from the filter bed to the lowest region of the central chamber. A lift pipe means, extending from the sump into the wash chamber, provides a conduit for liquid to flow from the central chamber to the wash chamber. The flow of the liquid into the lift pipe means draws the granules of the filter media from the sump, into the lift pipe means as the granules appear at the opening of the lift pipe means. Liquid and filter granules flow up the lift pipe and are deposited in the wash chamber.

Preferably, the differential in the liquid levels of the liquid in the central chamber and the liquid in the wash chamber generates a flow of the liquid up the lift pipe means, as the liquid seeks to level itself. The flow of liquid into and up the lift pipe means draws granular filter materials moved into the sump, from the sump and carries the filter material to the wash chamber and deposits both liquid and filter material, with captured contaminants, into the wash chamber. The granular filter materials are cleansed of the contaminants by an agitated wash, within the wash chamber, that is generated by multiple flows of liquid into the wash chamber from the central chamber. The returned, clean granular filter materials are directed to the top of the filter bed from where the filter bed is rebuilt. From the top of the filter bed, the filter materials move downward as the filter bed is depleted from the bottom. The filter granules at the bottom of the bed move into the sump and are withdrawn from the sump, up the lift pipe, in the cycle of operation of the filter apparatus.

Preferably, the wash chamber includes a neck or throat with an open mouth, through which the lift pipe extends into the wash chamber. The size of the fall-out opening is defined by the space between the throat and the lift pipe. This structure provides at least two defined flows of liquid into the wash chamber from the central chamber. The combination of these liquid flows generates a turbulence in the liquid in the wash chamber. It may be desirable to increase the turbulence in the liquid and that may be accomplished by placing one or more flow ports, such as holes or slots, for example, in the wall of the wash chamber, preferably somewhat below the outlet of the lift pipe in the wash chamber. These flow ports or openings, positioned below the level of the liquid in the central chamber, will provide additional flows of liquid into the wash chamber and would, among other advantages increase the agitation and turburlance of the liquid in the wash chamber and enhance movement of the granular media deposited in the chamber from the lift pipe.

The wash chamber walls may include a slidable shield for covering the flow ports in the wall of the wash chamber, as desired, making the size of the flow ports adjustable and the use thereof selectable.

From one aspect, the invention is a liquid filtering apparatus which provides a vertically structured sump in the bottom of the central chamber of the filter, which utilizes the full force of gravity to position the granular filter material of the filter bed in the sump, for relocation.

From another aspect, the invention is a liquid filtering apparatus which provides an adjustable deflector plate, positioned below the filtrate recovery means, that may be adjusted to provide desired interference with movement of the filter material of the filter bed past the filtrate recovery means.

From still another aspect, the invention is a liquid filtering device or apparatus which provides a variable size fall-out opening that includes an external adjustment or control for changing the size of the opening of the fall-out opening for fine tuning the filter apparatus.

From a still further aspect the invention is a liquid filtering apparatus which provides a conical deflector plate which intercepts and diverts granular filter material, returned from the wash chamber to the filter bed, to a defined drop zone on the filter bed for forming a filter bed of particularly defined layers of similar texture filter material.

DETAILED DESCRIPTION OF THE INVENTION

Figures 1, 1A:
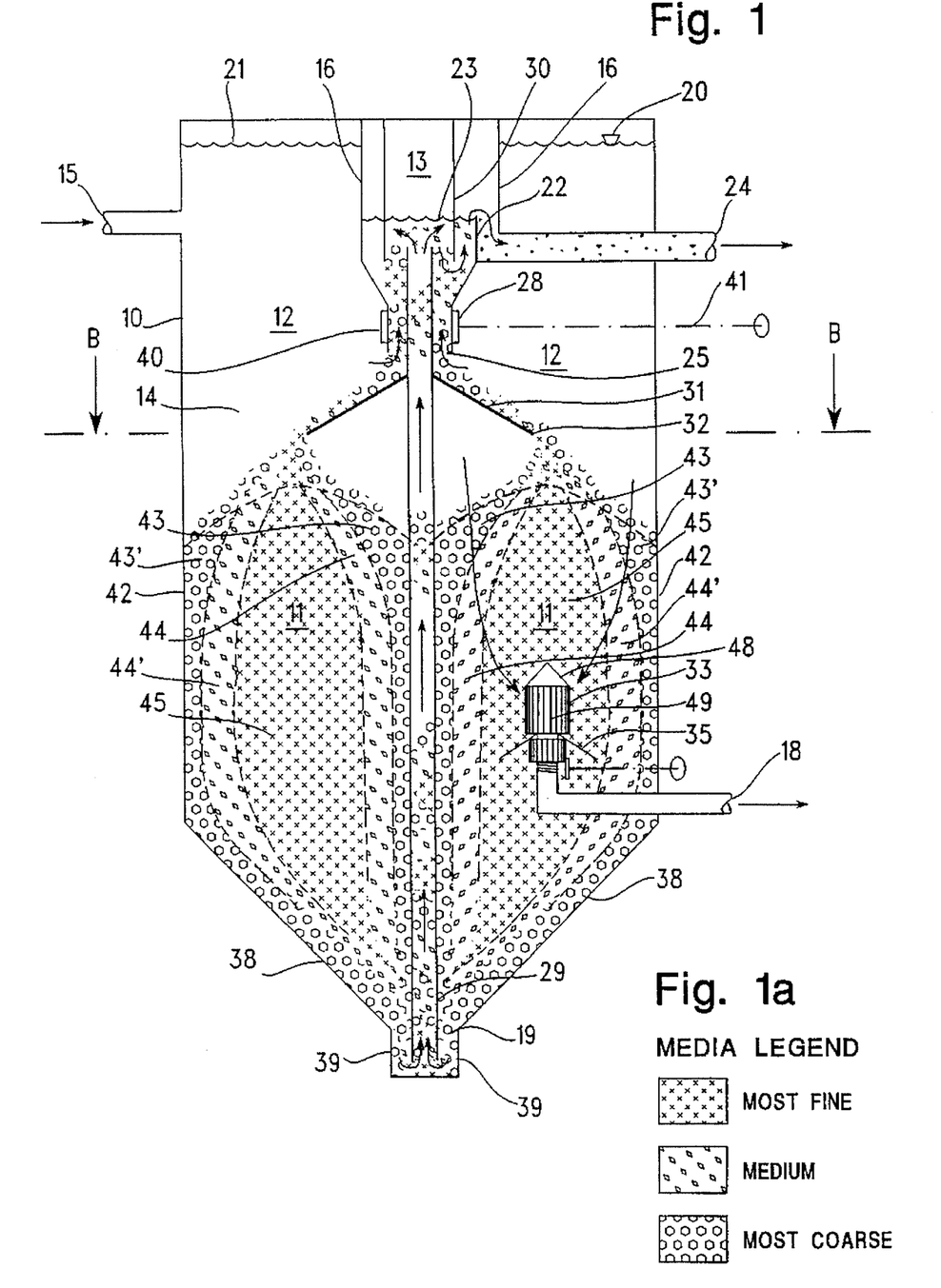
FIG. 1 is a representation, in sectional side view, of a preferred embodiment of the invention.
FIG. 1a is a legend of the texture of the filter media represented in FIG. 1 and FIG. 1b.

With reference to FIG. 1, a preferred embodiment of filter apparatus of the present invention is represented. The apparatus includes a vessel 10 for holding a liquid to be filtered. In addition to the liquid to be filtered, the vessel retains a mass of granular filter material of varying texture. Most of the filter media in the vessel is in the form of a filter bed 11 which filters the liquid 12 as the liquid passes through the filter bed. During the filtering process the filter media in the filter bed removes and holds or captures unwanted solid matter, referred to as contaminates, from the liquid passing through the filter bed. Portions of the filter media, with captured contaminants, are transported from the filter bed to a wash chamber 13 in the vessel, for cleansing. The filter media in the wash chamber is in a dynamic wash cycle which separates the contaminants from the filter media after which the filter media is transported back to the central chamber 14 for rebuilding the continuously depleting filter bed. All of the filter media in the vessel is in continuous motion.

The liquid to be filtered is in constant flow through the vessel. The liquid to be filtered is applied to the input 15 of the vessel, entering the central chamber. Most of the liquid is passed through the filter bed and filtered. Most of the filtered liquid is recovered as a filtrate, that is, a filtered liquid. A smaller portion of the filtered liquid is used to carry filter material containing captured contaminants to the wash chamber. A small portion of unfiltered liquid is used to agitate the materials in the wash chamber for separating contaminates from the filter material and to discharge contaminates separated from the filter material from the vessel.

The vessel 10 as represented in FIG. 1, includes at least one inlet 15, for applying liquid, under pressure, to be filtered to the central chamber 14 and at least one filtrate outlet 18, for dispensing the filtered liquid, or filtrate, from the vessel. The vessel is preferably cylindrical in shape with a tapered or inclined lower region which terminates in a centrally positioned sump 19. The geometry of the vessel is not critical. The central chamber 14 houses the filter bed 11. A float control means 20, connected to an outlet control valve (not shown) on outlet 18, for example, maintains the level of the liquid 12 in the central chamber 14 at a working level, 21, for example, by controlling the out flow of the liquid against the in flow of the liquid.

The upper central region of the vessel 10 includes a wash chamber 13, defined by walls 16. The wash chamber 13 includes an internal weir or dam 22, the top of which is below the working level 21 of the liquid in the central chamber 12. The overflow side of the weir is connected to the outlet 24 which permits liquid passing over the weir to escape from the vessel. This functions to maintain the liquid level 23 of the wash chamber below the level 21 of the liquid in the central chamber. The wash chamber includes a fall-out opening 25, through which cleansed filter media is returned to the central chamber of the vessel in the cycle of operation of the filter.

The fall-out opening 25 includes a neck 40 (the interior of which is referred as a throat) and open mouth, with a control valve means 28 which is remotely operated, for making the throat of the fall-out opening larger or smaller, thereby controlling the flow of liquid through the fall-out opening. In reducing the size of the throat above the mouth of the fall-out opening, care should be taken not to make the space between the throat and the lift pipe 29 too small, since, as explained below, washed filter material is dispensed from the wash chamber 13, through the fall-out opening 25, to the central chamber 12 and sufficient space is required to permit passage of the returned or recycled granular filter material.

The wash chamber 13 is connected to the lower region of the central chamber, at the sump 19, by the a lift pipe 29. The lift pipe extends through the mouth of the fall-out opening 25, past the neck (through the throat) and into the wash chamber 13, terminating with its open end below the level 21 of the liquid in the central chamber 12, as controlled by the float 20. Preferably the upper opening of the lift pipe 29 is just below the top edge of the weir 22, the top edge of which establishes the level of the liquid in the wash chamber. A baffle means 30, located between the weir 22 and the lift pipe 29 extends down from the top of the wash chamber to below the opening of the lift pipe, approximating the level of the outlet 24.

Below fall-out opening 25 of the wash chamber is a deflector cone or conical plate 31. The apex of the deflector cone 31 approximates the mid-point of a diameter passing through the vessel. The edge 32 of the inclined plate forming the deflector cone 31 approximates the mid-point of a radius of the vessel extending between the center of the vessel and the periphery of the vessel where the edge of the deflector cone is terminated. The location of the edge 32 of the inclined plate of the deflector cone 31 relative to the radius of the vessel is critical, if a balance in the layers of filter bed is desired.

A filtrate recovery chamber 33 is located in the central chamber of the vessel and is connected to the filtrate outlet 18. A deflector plate 35 is located at the bottom of the filtrate recovery chamber 33. This structure will be discussed below.

The internal structure of the vessel 10 which comprises the filter apparatus, is arranged to generate a pressure driven internal dynamic cycle of the liquid and filter material contained in the vessel when the central chamber of the vessel is filled to the working level and liquid is applied to the inlet and at least the wash chamber outlet is dispensing liquid.

As previously explained, the working level of the liquid in the central chamber 10 is maintained at 21, for example and the working level of the liquid in the wash chamber 13 is maintained at 23, for example, the liquid level 21 being higher that the liquid level 23. Thus two different levels of liquid are established and maintained in the same body of liquid. The difference between the level of the liquid in the central chamber and the level of the liquid in the wash chamber causes the liquid in the central chamber to be driven into the wash chamber through the lift pipe 29 and through the fall-out opening 25, as the liquid attempts to raise the level 23 to the level 21.

The flow of liquid through the lift pipe 29, from the sump 19 in the central chamber to the wash chamber, draws filter granules driven into the sump 19, into the lift pipe 29 with the liquid. The granules drawn into the lift pipe 29 leave a space in the sump 19 which is filled by other granules from the filter bed 11. This is a continuous action that depletes the filter bed 11 from the bottom of the bed, causing the granular filter material in the filter bed 11 to move toward the sump 19, the inclined walls 38 of the vessel directing the materials in the filter bed toward the sump 19. The vertical walls 39 of the sump 19 permit utilization of the full force of gravity to transport the granular filter material to the bottom of the sump 19 from the filter bed 11.

The granular filter materials driven into the sump include captured contaminants, which are transported to the wash chamber 13 through the lift pipe 29 with the flow of the liquid through the lift pipe. The filter materials and the contaminates are deposited in the wash chamber 13 and are met by another liquid flow, through the fall-out opening. The flow of liquid from the lift pipe is essentially a strong flow, originating from the lowest region of the vessel. The flow of liquid from the fall-out opening is a substantially less strong flow, originating from a higher region of the vessel. The difference in the strength of the flows of liquid entering the wash chamber, results in a filter washing action, in the wash chamber, that separates the contaminants from the filter granules. The released contaminates are carried out of the wash chamber, over the weir 22 and out the outlet 24. The filter materials fall out of the wash chamber through the throat and mouth of the fallout opening.

Preferably, a strong flow of liquid up the lift pipe 29 is generated in order to draw granular filter material, with captured contaminants, from the sump 19 and transport the granular filter material and the contaminants to the wash chamber, with the liquid.

Preferably, the neck 40 of the fall-out opening 25 is made of a flexible material that may be narrowed or expanded in order to control the flow of liquid into the wash chamber through the fall-out opening 25. Accordingly, a control valve means 28 is provided, which may be operated externally of the vessel 10, by control means 41 to enlarge or reduce the size of the opening between the throat and the lift pipe 29. Control over the flow of liquid through the fall-out opening may be used to fine tune the cyclic operation of the filter.

Referring to FIGS. 1 and 1a, the MEDIA LEGEND in FIG. 1a indicated the representation used for the texture of the multiple textured granular filter material represented in FIG. 1 as MOST FINE; MEDIUM and MOST COURSE. Although three different grades or textures of material are represented, it is apparent that more than three or less than three different textures of material may be present in a granular filter media.

Referring again to FIG. 1, a preferred embodiment of the vessel 10 and its structure is represented, in operating condition. The filter vessel is receiving a liquid to be filtered and the level of the liquid in the central chamber 12 is at 21, which is represented as a working liquid level of the filter system.

For convenience, the shape of the vessel 10 is represented as cylindrical, the length of which exceeds the diameter, however the geometry of the vessel is not necessarily critical and the vessel may be in other geometric shape, as desired.

The vessel 10 retains a granular filter material represented in MOST FINE, MEDIUM and MOST COURSE texture, the granular filter material forming a filter bed 11 in the central chamber 12, of the vessel. The filter bed is represented in a working orientation which may be established and maintained when practicing the invention.

Figure 1B:
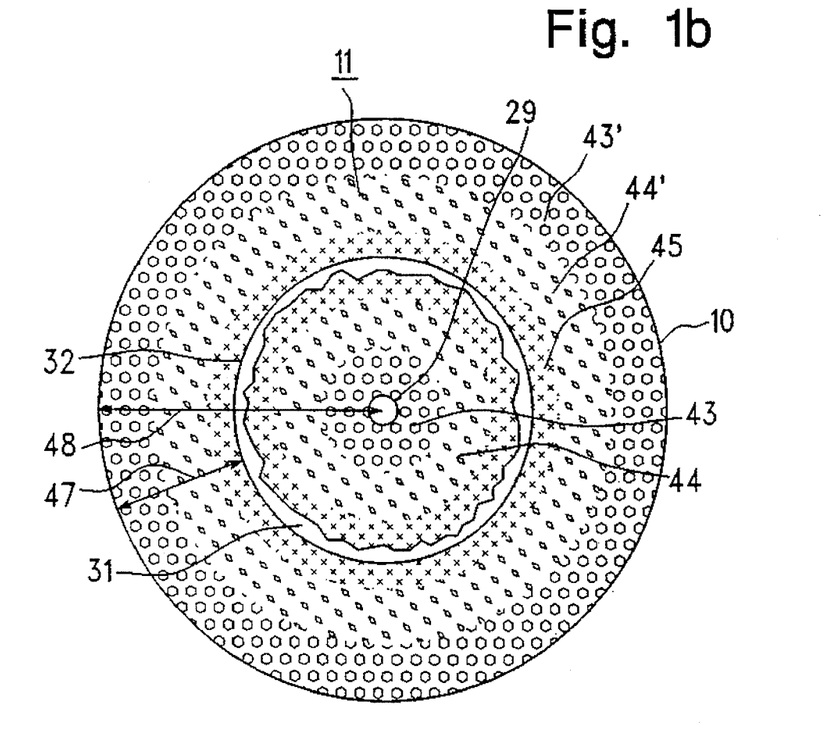
FIG. 1b is a cross sectional view of the invention shown in FIG. 1 at line B—B on FIG. 1.

The lift pipe 29 is centrally positioned in the central chamber 12 as represented in FIG. 1a, extending substantially from the sump 19 of the vessel to the wash chamber, 13 in the upper region of the vessel. The cross section of the filter bed 11 is a torus or doughnut shape, the lift pipe 29 defining the hole in the doughnut shape. Being doughnut shape, the filter bed has an inside surface and an outside surface, the inside surface being along the lift pipe and the outside surface being along the interior wall 42 of the vessel. As represented in FIGS. 1 and 1b, the filter bed 11 is formed in a plurality of vertical layers of filter material. These vertical layers are represented as interior Most Coarse layer 43 and exterior Most Coarse layer 43', interior Medium layer 44 and exterior Medium lay 44' and Most Fine 45.

Orientation of the vertical layers of granular filter media is established during the cyclic flow of the filter system by diverting the movement of the filter media returning to the filter bed, from the wash chamber, by the conical deflector plate 31 so as to direct the filter media to a desired drop zone on the filter bed.

As seen in FIG. 1b, a cross-sectional view of the representation of the invention along line B—B, in FIG. 1, the edge 32 of the conical deflector plate 31 approximates the mid-point (½ R) of the radius 48 of the vessel 10. From this preferred position of the edge 32 of the inclined plate of the conical deflector, the various granules of the filter material which have moved down the incline portion of the conical deflector 31 to the edge 32, drop off the edge toward the filter bed. The granules separate, according to texture by natural classification, forming vertical layers of like granules. The most fine textured granular materials fall into and remain in the center of the drop zone, forming a most fine layer 45 in the center of the filter bed 11. The medium texture granular materials fall and spread out to both sides of the drop zone of the most fine materials forming layers of medium granules 44 and 44' on both sides of the most fine layer 45. The most coarse of the granular materials falling from the edge 32 of the deflector plate spread out further, forming layers 43 and 43' on the inside and outside of the inside layer 44 and the outside layer 44' of medium texture material, respectively. A mid-radius position of the edge 32 position the various layers of the multi-textured granular filter material in the filter bed with the most fine filter layer centered inside the doughnut shape filter bed. By changing the location of the edge 32 along the radius of the vessel 10, the location of the various layers of filter material may be shifted, with the relationship between the layers remaining unchanged.

Looking at FIG. 1b, a cross-section of the filter bed 11 in the vessel 10, the filter bed appears torus or doughnut shape, the hole of the doughnut shape being the lift pipe 29. By selecting a ratio of volumes of granules of different texture, one to the other, the width of the vertical layers of the various texture granules may be established, as desired.

Alternatively, by selectively positioning the edge 32 of the inclined plate of the conical deflector 31 in the central chamber, a drop zone, for the returned granular filter media, on the filter bed may be defined and location of the layers of the filter bed, may be established, as desired.

Preferably, a filtrate recovery chamber 33, for example, is positioned in an area of the most fine granular media layer. Although only one filtrate recovery chamber is represented, is should be understood that more than one may be used, if desired. Preferably, the filtrate recovery chamber 33 includes a closed conical top 48, with apex extending upward, into the most fine layer of filter media in the filter bed, a closed bottom and side walls between the top and the bottom. The side walls include one or more openings, or may be perforated for permitting passage of the filtrate through the side wall into the chamber of the filtrate chamber. The side wall opening may be covered by a filter sieve 49, which permits passage of the filtrate but is sufficiently fine to keep the most fine granules in the filter media from passing into the recovery chamber. A deflector plate 35 is located adjacent the closed bottom of the recovery chamber, down stream in the movement of the filter media from the side walls of the filtrate recovery chamber. The filtrate recovery chamber 33 also includes a pipe means 18, connected to the bottom of the chamber, for evacuating the filtrate from the filtrate recovery chamber. Preferably, the deflector plate is planar in contour, but may be curved, if desired.

Preferably the deflector plate 35 is adjustable. This is clearly shown in FIG. 2. The angle at which the blades of the plate may be oriented, relative to the movement of the filter media past the side walls or filter sieve 49, is changeable. The deflector plate 35, is planar and may be composed of a plurality of blades, the edges of which overlap forming a circular plate. The blades of the plate 35 are hinge 50 mounted on or near the bottom of the filtrate chamber. The filtrate draw-off pipe 18, connected to the bottom of the housing of the filtrate recovery chamber is threaded with conventional threads 51 on the exterior thereof. A collar 52, tapped with conventional threads, is screwed on to the threads 51. The exterior of the collar 52 has longitudinal gear teeth 53. A rod 54 is mounted on the pipe 18, below the travel of the collar 52, the rod 54 passing through and extending outside the vessel 12. A gear plate 55 is connected to the rod 54 so as to rotate with the rod when the rod is turned. The gear plate 55 has gear teeth that mate with the gear teeth 53 on the collar 52. When the rod 54 is rotated, the gear plate 55 rotates and the teeth 58 on the gear plate mesh with the teeth 53 on the collar 52 thereby rotating the collar and driving the collar up or down the threads 51 in the pipe 18, according to the direction of rotation of the rod 54. Other means for rotating and/or moving the collar toward and away from the deflector plate may be used, as desired.

Figure 2:
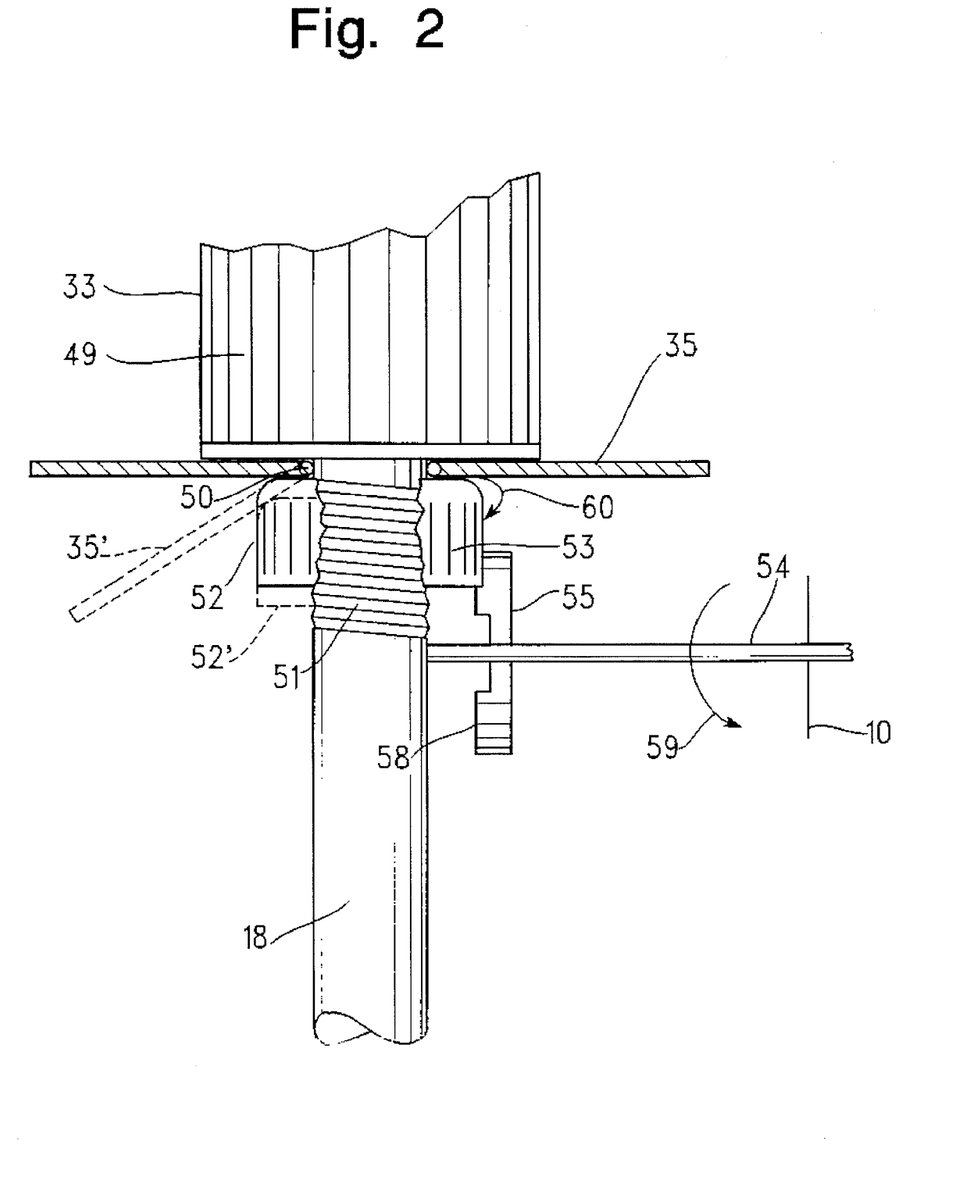
FIG. 2 is a representation of one embodiment of apparatus for varying the attitude of the deflector plate associated with the filtrate recovery chamber.

The collar 52 is represented in full elevated position with the top of the collar impinging on the bottom of the plates 35 of the deflector plate, holding the deflector plate at a maximum interference-to-the-flow position, without generating a back flow of the filter media. By rotating the rod 54 counter clockwise, as represented by arrow 59, the collar will be rotated in the direction of the arrow 60, and will ride down the threads 51. Lowering the collar 52, such as at 52', for example, on the threads will permit the deflector plate 35 to re-orient its angular position relative to movement of the filter media passing the sieve, such as represented by the plate 35', in broken line form.

The deflector plate, which checks or blocks the progress or movement of the granular filter materials forming the filter bed, particularly that passing the side walls of the filtrate recovery chamber, may be a planar plate or a curved or nonflat plate. The plate may have a closed or solid surface which, when positioned other than parallel with the direction of movement of the materials in filter bed, interferes with or checks the movement of the materials of the filter bed, depending on the angular orientation of the deflector plate, relative to the movement of the filter materials in which the filter plate is located or positioned. The greatest effect of the deflector plate on the materials in the filter bed is on the materials directly upstream from the deflector plate. With the deflector plate positioned substantially at ninety degrees to the direction of movement of the filter materials, maximum check of the movement is achieved, without blockage. As the plate is moved angularly, in the direction of the movement of the filter materials, so as to increase the angle toward one hundred eighty degrees, the degree of check is progressively reduced.

Alternatively, the deflector plate may have an open or sieve-like surface, which, when the holes in the surface of the plate are open, exerts very little check on the movement of the filter materials moving past or through the plate and when the holes are closed exerts maximum check for the particular plate. The size of the holes, this is, between fully open and fully closed may be adjustable.

Figure 3:
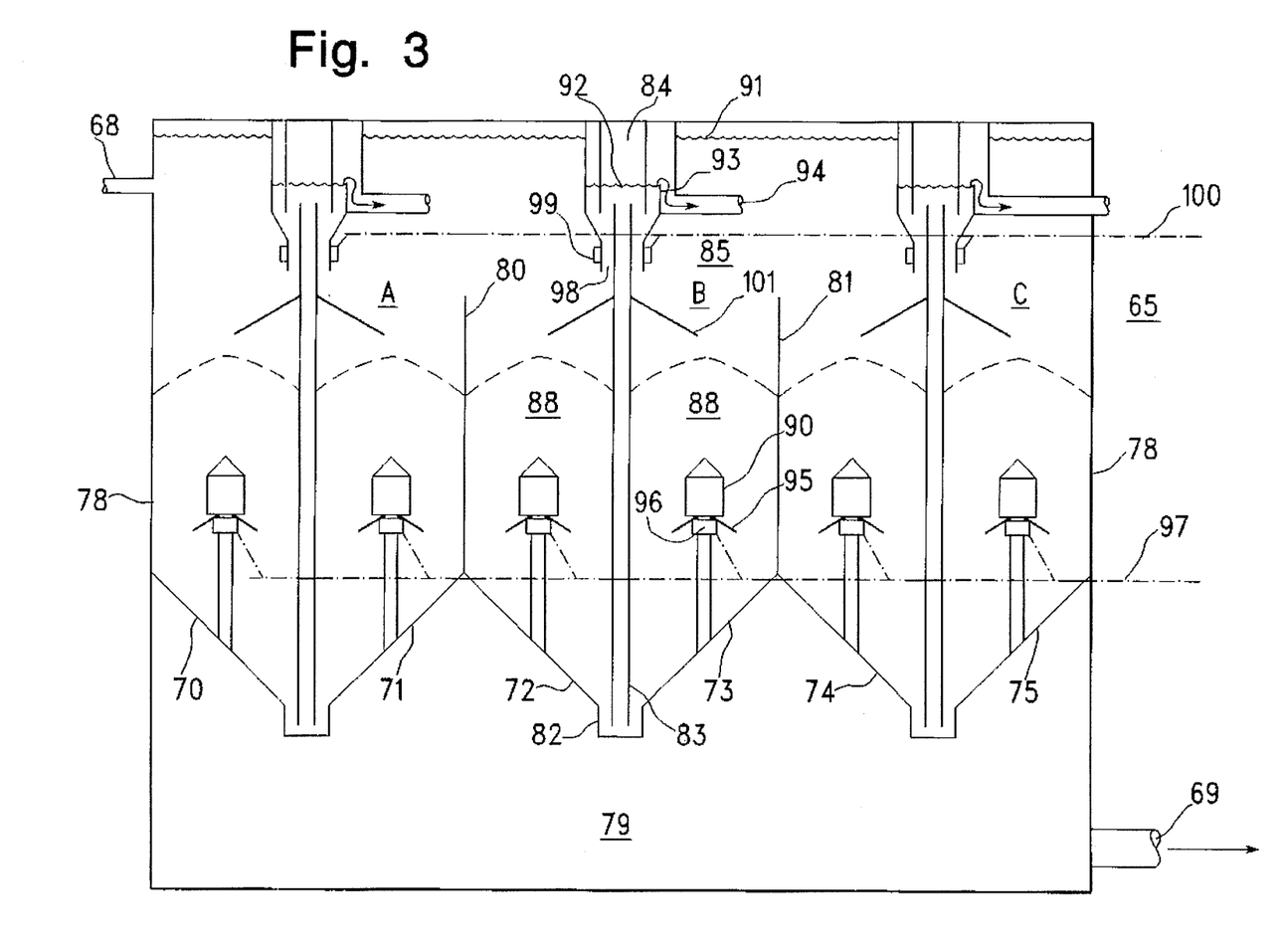
FIG. 3 is a representation of a filter system employing a plurality of filter units of the present invention; and, FIG. 4 represents an alternate structure of wash chamber.

Attention is directed to FIG. 3, which represents a liquid filtering system in which a plurality of filter units A, B and C, for example are housed in a housing 65. It should be understood that more than three filter units or fewer than three filter units may be used in a filter system, as desired.

The housing 65 has an inlet 68 for supplying the liquid to be filtered to the system and an outlet 69 from which the filtered liquid or filtrate may be dispensed. The base or bottom of the filter units 70–75 are connected together and to the walls 78 of the housing 65 and define a filtrate holding chamber 79.

Filter unit B, for example, is defined by side walls 80 and 81, with an open central chamber which is common to all the filter units in the housing. The filter B includes inclined walls 72 and 73 and a sump 82, between the inclined walls. A lift tube or pipe 83, which has a lower opening in the sump 82, extends from the sump to a wash chamber 84 in the upper region of the central chamber 85, defined by the upper region of the housing 65. That part of the central chamber which supports the filter bed 88, is defined by the common walls 80 and 81. Each of the filter unit include two filtrate recovery chambers, such as 89 and 90 in filter unit B. Each filter recovery chamber is connected to a common filtrate holding chamber 79.

The level of the liquid to be filtered by the system is maintained at least at a working level 91, which is above the level 92 of the liquid in the wash chamber 84. The working level 91 of the liquid in the central chamber 85 is common to all the filter units. The level of the liquid in the wash chamber is maintained at a level below the working level by the weir 93 and the liquid outlet 94.

Each of the filtrate recovery chambers include an adjustable turbulence deflector plate 95 and a threaded collar 96, such as represented in FIG. 2. The threaded collars of each filter unit are represented as connected to a common control 97, however, each could be connected to a separate control for individually adjusting the individual deflector plate.

Each wash chamber includes its own fall-out opening, such as 98, between the wash chamber and the central chamber of the filter unit of which the wash chamber is a part. Each fall-out opening is adjustable so that the liquid flow into the wash chamber may be controlled. The fall-out opening control means 99 of each filter unit is tied to a common control 100, although each #all-out opening control means may be tied to a separate, individual control for individual control of each fall-out opening, if desired.

The outlets 94 of each wash chamber 84 are fed to a common outlet (not shown) where some of the liquid and the removed contaminants are recovered for disposal or separate treatment.

Each filter unit includes a conical deflector plate 101 which intercepts the filter material returned from the wash chamber 84 to the filter bed 88.

The filtrate recovery chambers 89 and 90, each include a controlled deflector plate 95 and a control collar 96 each of which are represented as coupled to a common control shaft 97. Since a common filtrate holding tank 79 is provided the filtrate recovery outlet pipe of each filtrate recovery chamber is fed into the holding tank 79.

It will be appreciated that although there are some structural differences between the preferred embodiment of the invention and the filter unit in the system, a filter apparatus as represented in FIG. 1 and a filter unit as represented in FIG. 3 will function substantially the same.

Figure 4:
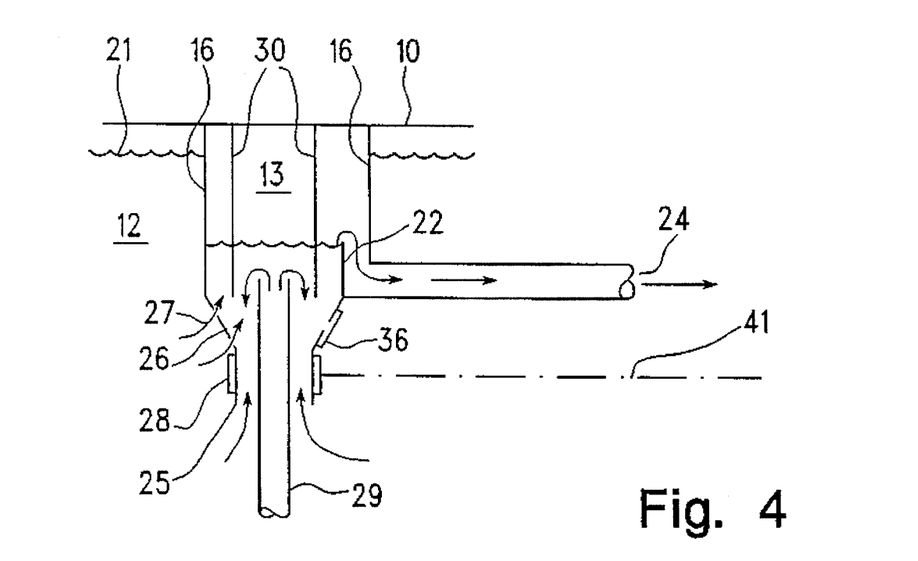

With reference to FIG. 4, it may be desired to increase the turbulence of the liquid in the wash chamber 13. This may be do by adding flow ports 27 (holes or slots) to a wall portion of the wash chamber below the level 21 of the liquid in the central chamber 12.

Preferably one or more liquid flow ports 27 are positioned in the inclined portion 26 of the wall 16 at a location below the outlet of the lift pipe 29.

A slide cover 36 may be coupled to the wall of the wash chamber, either interior or exterior, and made movable from outside the vessel 10, to cover the flow ports, wholly or partially, as desired.

Thus there has been represented and described a preferred embodiment of my novel liquid filtering apparatus, from which several described advantages are obtained, and a filter system employing filter units of the present invention. When filtering a liquid, which could be water or any other filterable liquid, in my novel filter apparatus, the filtering apparatus is self cleaning and is driven by a pressure differential developed and maintained by the operating filter apparatus. The filter apparatus is driven through the filter cycle, which includes passing the liquid through a filter bed, removing contaminants from the liquid by capturing the contaminants by the filter materials forming the filter bed; progressively drawing filter material from the filter bed; cleaning the contaminants from the filter material in a wash chamber driven by the filter apparatus; returning the filter material to the filter bed to make a new, clean filter bed; recovering the filtered liquid; and, disposing of the contaminants, by pressure and pressure differences of the liquid being filtered.

When the operation of the filter requires adjustment, movement of the filter media past the filter sieve on the filtrate recovery chamber may be increased or slowed down, as desired, by externally adjusting the angular position of the deflector plates below the filtrate recovery chamber. Operation of the filter apparatus may be fine tuned by adjusting the size of the throat of the fall-out opening to change the flow of liquid into the wash chamber from the central chamber.

It may be desirable to increase the flow of liquid, and therefore the movement of filter material, up the lift pipe or lift means. To increase the flow of liquid in the lift pipe, air, and/or some other gas may be injected into the lift pipe as shown in my U.S. Pat. No. 5,175,194, issued Dec. 22, 1992. Certain gases, such as chlorine, for example, may be injected into the filtering apparatus and may sanitize the liquid, if desired.

The operation of my present filter apparatus may be further remotely adjusted and/or fine tuned, by changing, as desired, the size of the opening in the fall-out opening of the wash chamber.

More surface area of the most coarse textured granular filter media layer is obtained by using a conical deflector plate to selectively locate the filter bed build-up area for the filter bed in the collection chamber. The thickness of the vertical layers of the filter material in the filter bed may be established, as desired, by adjusting the relative volume, the various texture of granular filter media forming the filter bed.

These and other advantages are obtained when practicing my invention. Although a preferred embodiment of the invention has been described relative to the drawings, and some modifications have been suggested, changes and other modification may be made, as may become apparent to those skilled in the art, without departing from the invention.

What is claimed is:

1. In an improved filter apparatus for filtering contaminants from a liquid introduced into said filter apparatus and extracting said liquid from said filter apparatus as a filtrate wherein said filter apparatus includes a vessel having a first chamber for receiving said liquid from an input means and first level control means for maintaining said liquid in said first chamber at a first predetermined level, said vessel containing a mass of granular filter material defined by a first granular filter material having a first granular texture, a second granular filter material having a second granular texture and a third granular filter material having a third granular texture, said first chamber supporting a first filter media defined by a first portion of said mass of granular filter material, said first filter media being in continuous movement defining a dynamic filter bed, and a filtrate recovery chamber, including a filtrate draw-off means, positioned within said dynamic filter bed, said filtrate draw-off means defined by a connecting conductor for conducting filtrate from said filtrate recovery chamber to outside said vessel, a second chamber for continuously receiving a second filter media defined by a second portion of said mass of granular filter material, said second filter media drawn from said dynamic filter bed along with a first portion of said liquid from said first chamber, said second chamber including a second level control means for maintaining said first portion of said liquid in said second chamber at a second predetermined level, a lift pipe means connecting said second chamber to a bottom region of said first chamber for continuously conducting said second filter media and said first portion of said liquid from said bottom region of said first chamber to said second chamber and for depositing said first portion of said liquid and said second media in said second chamber, a return opening between said first chamber and said second chamber for permitting a second portion of said liquid to flow from said first chamber into said second chamber and for continuously returning said second filter media to said first chamber for replenishing said dynamic filter bed, wherein the improvement comprises:

a conical deflector plate having an apparent apex positioned below and approximating a mid-point of a diameter of said return opening positioned at about a midpoint on a radius of a cross section of said dynamic filter bed, said conical deflector plate intercepting said second filter media returning to said first chamber from said second chamber and for directing said second filter media to a predetermined drop zone on said dynamic filter bed for generating a filter bed defined by a first discrete, vertically oriented circular layer of said first texture granular filter material interposed between a second discrete, vertically oriented circular layer and a third discrete, vertically oriented circular layer said second discrete layer and said third discrete layer each being of said second texture granular filter material, said second discrete layer interposed between said first discrete layer and a fourth discrete, vertically oriented circular layer of said third texture granular filter material and said third discrete layer interposed between said first discrete layer and a fifth discrete, vertically oriented circular layer of said third texture granular filter material; and said filtrate recovery chamber positioned in said first discrete, vertically oriented circular layer of first texture granular filter material, and substantially surrounded by said first texture granular filter material.

2. In an improved filter apparatus as in claim 1 wherein said first texture granular filter material is a most fine texture granular filter material, said second texture granular filter material is a medium texture granular filter material and said third texture granular filter material is a most coarse texture granular filter material.

3. In an improved filter apparatus as in claim 2 and in which said filtrate recovery chamber is positioned substantially within said first discrete, vertically oriented circular layer of first texture granular filter material for recovering filtrate from said most fine texture granular filter material.

4. In an improved filter apparatus as in claim 2 and in which said filtrate recovery chamber is located within said first discrete, vertically oriented circular layer of first texture granular filter material and said filtrate recovery chamber is substantially surrounded by only said first texture granular filter material, said filtrate recovery chamber for recovering filtrate from said most fine texture granular filter material.

5. A filter apparatus for filtering unwanted contaminants from a liquid introduced into said filter apparatus, said filter apparatus comprising:

a vessel having an inlet means for introducing a liquid into a first chamber in said vessel, said first chamber supporting a filter bed of a filter material, said filter material being granular and multi-textured, ranging from a most coarse texture, to a medium texture, to a most fine texture, said filter bed for filtering said liquid, said vessel including an outlet means for dispensing filtered liquid as a filtrate from said vessel, and a first liquid level control means for maintaining said liquid level in said first chamber at a first predetermined level, and a second chamber positioned in said first chamber, spaced from a bottom region of said first chamber;

a conduit means connecting said first chamber with said second chamber for conducting a first portion of said liquid and a part of said filter material from said filter bed to said second chamber from said first chamber and for depositing said first portion of said liquid and said part of said filter material in said second chamber, said second chamber including second liquid level means for maintaining said first portion of said liquid in said second chamber at a second level for creating a flow of said first portion of said liquid through said conduit means from said first chamber to said second chamber and for carrying with said flow said part of said filter material from said filter bed, and a first opening in said second chamber having an opening, approximating a mid-point on a diameter of a cross section of said filter bed for providing egress for said part of said filter material for leaving said second chamber and returning to said filter bed; and a conical deflector plate, located in said first chamber, having an apparent apex approximating said mid-point on said diameter, said conical deflector plate having an uninterrupted inclined surface extending from said apparent apex to an edge, said edge approximating a mid-point on a radius of said cross section of said filter bed, said uninterrupted inclined surface for deflecting said part of said filter material returning to said filter bed to a predetermined drop zone on said filter bed for permitting said part of said filter material to be classified according to texture during a drop from said edge for forming said filter bed, said filter bed defined by a plurality of torus shaped, vertically extended, discrete layers of granular filter material defined by a first torus shaped, vertically extended, discrete layer of said most fine texture granular filter material approximating said mid-point of said radius of said filter bed, said first torus shaped layer interposed between a second torus shaped, vertically extended, discrete layer of said medium texture granular filter material and a third torus shaped vertically extended, discrete layer of said medium texture granular material, said second torus shaped layer interposed between said first torus shaped layer and a fourth torus shaped, vertically extended discrete layer of most coarse texture granular filter material and said third torus shaped layer interposed between said first torus shaped layer and a fifth torus shaped, vertically extended, discrete layer of most coarse texture granular material.

6. A filter apparatus as in claim 5 and wherein said outlet means is defined by a filtrate recovery chamber positioned in, and substantially surrounded by said granular filter material of said most fine texture defining said first torus shaped, vertically extended, discrete layer, said filtrate recovery chamber including a closed top, a closed bottom and side walls between said closed top and said closed bottom, said side walls including a perforated portion thereof for permitting passage of filtrate therethrough, and a conductor means, connected to said closed bottom and to a wall of said vessel, for conducting said filtrate from said filtrate recovery chamber to outside said vessel.

\* \* \* \* \*